Feb. 29, 1944. H. M. SMITH Re. 22,450

SIGNAL GENERATING APPARATUS

Original Filed Oct. 10, 1940 2 Sheets-Sheet 1

Inventor:
Henry M. Smith,
by Harry E. Dunham
His Attorney

SIGNAL GENERATING APPARATUS

Original Filed Oct. 10, 1940 2 Sheets-Sheet 2

Inventor:
Henry M. Smith,
by Harry E. Dunham
His Attorney

Reissued Feb. 29, 1944 Re. 22,450

UNITED STATES PATENT OFFICE 22,450

SIGNAL-GENERATING APPARATUS

Henry M. Smith, Schenectady, N. Y., assignor to General Electric Company, a corporation of New York Original No. 2,335,705, dated November 30, 1943, Serial No. 360,610, October 10, 1940. Application for reissue January 15, 1944, Serial No. 518,433

15 Claims. (Cl. 315—11)

Figure 1:
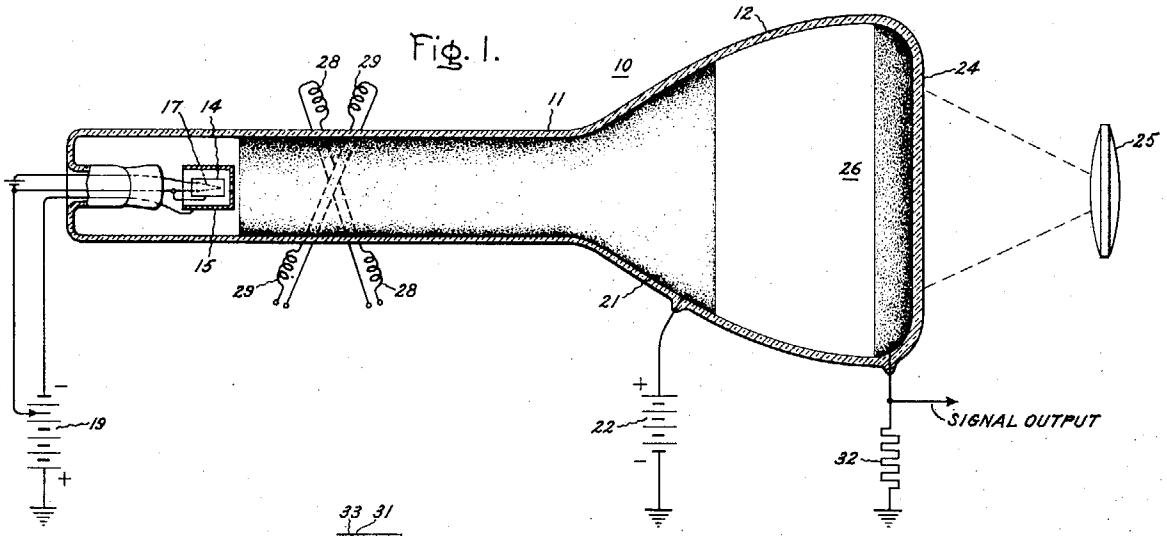

The present invention relates to apparatus for generating an electrical signal which is representative of a light image. It is especially concerned with improvements in television camera tubes of the type in which signal-generation depends upon scanning a picture-charged surface with a moving electron beam.

In apparatus of the character specified, it is common to make use of a photosensitive electrode having a large number of discrete elemental areas which tend to become positively charged by the loss of light-released electrons. In a system of this kind, it is the function of the scanning beam periodically to neutralize the charges accumulated on the various photosensitive areas and by so doing to develop a varying electrical signal which is representative of the light values to which such charges are due.

A difficulty encountered in the application of the system just described consists in the apparent impossibility of maintaining a sufficient electrical field in the vicinity of the photosensitive element to assure the removal from its surface of all or even of a large percentage of the electrons released by the light to which the element is exposed. Even if an adequate field is initially established by the use of appropriate electrode structures, the necessary conditions of operation are such that the photosensitive element as a whole soon becomes electrostatically charged in a manner tending to reduce the field to zero. For this reason, the sensitized element is obliged to function under conditions of low efficiency as measured in terms of the signal strength obtainable by exposing the element to a visible scene of given light intensity and contrast.

It is an object of the present invention to provide an improved signal-generating system in which the picture-responsive component may be operated under conditions favoring the attainment of the best performance of which this component is capable.

A feature of the invention which is useful in the fulfillment of the foregoing object consists of an arrangement in which the scanned surface is provided by a porous insulating layer which is superimposed on the picture-sensitive element and which normally charges to a potential at which it maintains a strong electrical field acting on the element. In the use of this arrangement, electrons released by light from the various areas of the photosensitive element are accumulated on adjacent areas of the insulating layer and thus tend to produce localized variations in the charge of this layer. As the various areas are successively traversed by the scanning beam, they tend to become restored to normal charge by the delivery of secondary electrons, the number of secondaries given up by each area being a function of the number of primary electrons which it has received from the photosensitive surface. The variations in secondary electron current thus realized may be converted into a television signal voltage in any one of several ways.

A further important aspect of the invention consists in the provision of means for producing amplification of the light image desired to be transmitted before it is caused to affect the sensitive element with which the scanned insulating layer is associated. This may be done, for example, by first converting the light image into an electron stream of corresponding cross-sectional pattern and sufficiently accelerating the stream by electrical means to obtain amplification effects of the desired magnitude. Other and more specific means of amplification are described hereinafter.

Figure 2:
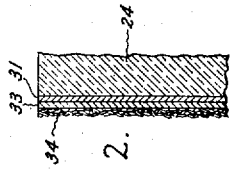
Figure 3:
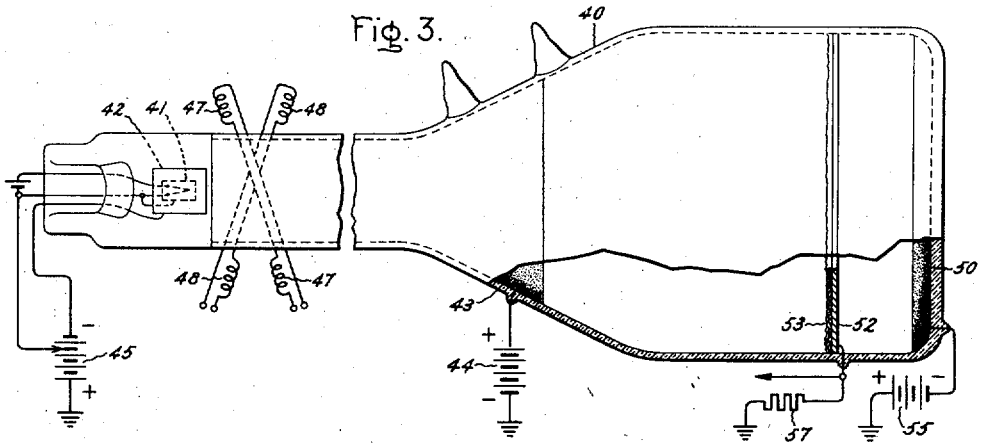
Figure 4:
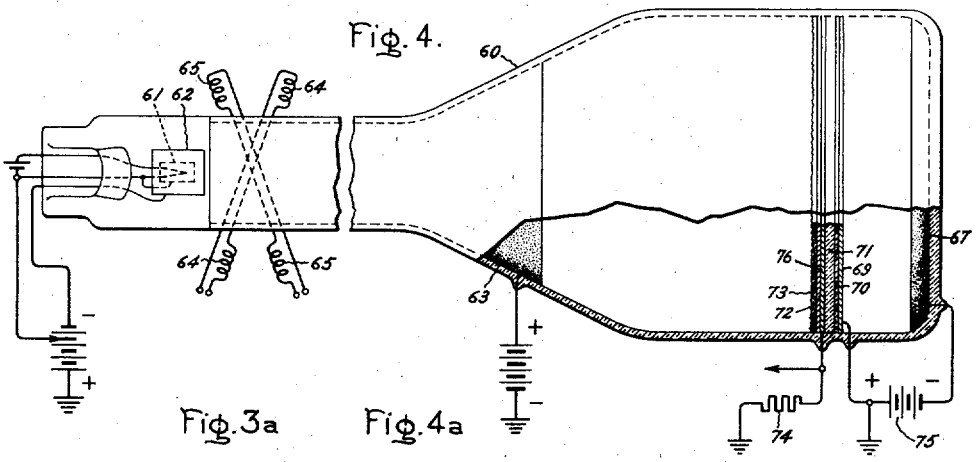
Figure 3A:
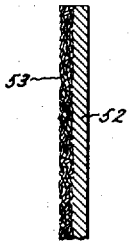
Figure 4A:
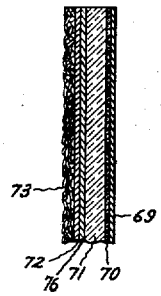

The features which I desire to protect herein are pointed out with particularity in the appended claims. The invention itself, together with further objects and advantages thereof, may best be understood by reference to the following description taken in connection with the drawings in which Fig. 1 represents a signal-generating apparatus suitably embodying the invention; Fig. 2 is an enlarged fragmentary view of one feature of the apparatus of Fig. 1; Fig. 3 represents a modified application of the invention; Fig. 3*a* is an enlarged detail of one part of Fig. 3; Fig. 4 shows a still further modification of the invention, and Fig. 4*a* is an enlarged detail of one part of Fig. 4.

Referring particularly to Fig. 1, there is shown a cathode ray tube which is designated as a whole by the numeral 10 and which includes an elongated shaft portion 11 and an enlarged bulbous portion 12. Within the shaft portion 11 and near the extremity thereof, there is provided an electron gun comprising the combination of a cathode 14 and an apertured control electrode or grid 15. The cathode is preferably separately heated and includes for that purpose an internal resistance heater indicated in dotted outline at 17. The cathode is maintained at from several hundred to several thousand volts below ground by means of a voltage source (indicated as a battery 19) which also serves to maintain the electrode 15 at a negative potential with respect to the cathode.

The electrons emitted by the cathode are accelerated and focused into a concentrated beam by means of an anode 21 which is maintained at from several volts to several hundred volts above ground by a voltage source 22 connected thereto. The anode may comprise, for example, a coating of a conductive material such as aluminum or palladium applied to the interior wall surface of the envelope and extending into the bulbous portion thereof.

The end of the tube envelope which is remote from the electron gun is provided with a generally planar surface 24 adapted to serve as a window for light radiations focused thereon, for example, by a lens system indicated schematically at 25. The inner surface of the window 24 is provided with a target (designated as a whole by the numeral 26) the nature of which will be more fully explained hereinafter. The various elemental areas of this target are caused to be scanned by the electron beam by means of two mutually perpendicular sets of magnetic deflecting coils which are respectively indicated in diagrammatic fashion at 28 and 29.

In accordance with the present invention, the target 26 comprises the combination of a semi-transparent conductive layer of photosensitive material having applied directly thereto a thin porous layer of insulating material. The structure of the target is best shown in Fig. 2 which represents an enlarged fragmentary section of the envelope window portion 24. According to the preferred form of the invention, the interior surface of the window 24 is provided with an extremely thin conductive layer 31 consisting, for example, of rhodium which has been sputtered or evaporated on the surface of the window. It is the function of this layer to impart additional transverse conductivity to the target so that the target potential may be fixed at a desired level. The layer 31 is connected to ground through a resistor 32 which, as will be later explained, assists in the development of a signal voltage.

On the layer 31 there is provided a conductive layer 33 of photosensitive material which is also of such thickness as to be of semi-transparent character. This layer may comprise, for example, antimony which has been subjected to a caesium vapor or it may comprise the combination of silver oxide and caesium. The layer 33 is covered in turn with a porous coating 34 of an insulating material such as magnesium oxide, aluminum oxide, calcium fluoride or the like. The porosity of this layer should be such that it is in effect constituted of a large number of discrete elemental areas separated by small openings or crevices.

With an arrangement such as that described, a light image falling on the tube window 24 will release electrons from the photosensitive layer 33 in a pattern determined by the variations of light and shadow in the image. If the layer 33 is of sufficient thinness (say on the order of a few hundred angstrom units), the electrons thus released may escape from the side of the layer opposite the window 24. Under these circumstances and for a reason to be shortly explained, the electrons escaping from the various points of the layer 33 will be received and retained by the correspondingly located elemental areas of the porous insulating layer 34.

The explanation for the foregoing lies in the fact that the continuous scanning of the surface of the insulating layer 34 by the electron beam produces secondary emission from the layer in such fashion as to cause its surface to become positvely charged. This charging will continue until the insulating layer reaches approximately the potential of the electrode 21, at which time the secondary emission ratio will drop to unity. Thereafter, in the absence of any disturbing effect, the layer will tend to float stably at this potential.

It will be noted that with the circuit connections illustrated, the potential of the electrode 21 is above the ground potential and consequently above the potential at which the photosensitive layer 33 is maintained. As a result of this circumstance, a positive field will exist in the vicinity of the surface of the photosensitive layer 33. With appropriate conditions of operation, this field may readily be made strong enough to cause substantially all photoelectrons released from the photosensitive layer to escape from its inwardly directed surface. The electrons escaping from any element of the photosensitive layer will be acquired by the positively charged surface of the nearest insulating element, thus reducing its positive charge by the amount of the electron charge collected. The insulating layer as a whole will, therefore, be characterized at any instant of time by the possession of electrostatic charges which vary from point to point over its surface in accordance with the variations of the light image projected through the window 24.

As the various elements of the charged insulating layer are traversed by the scanning beam, each element which differs in potential from the electrode 21 may be expected to release secondary electrons in a ratio greater than unity until the normal charge of the scanned element has been restored. The total number of electrons released by any given element during each scanning period will therefore be a direct function of the extent to which its charge has departed from the normal value because of electrons received by it from the photosensitive layer.

The variations in secondary electron current thus realized as the scanning beam progresses from point to point may be used to produce a signal voltage representative of the light image in an appropriate circuit connected either with the electrode 21 (by which the secondary electrons are collected) or with the conductive layer 31. Fig. 1 shows the latter arrangement, and in connection with this figure, it is assumed that the voltage developed across the resistor 32 is applied as a signal voltage to an amplification system through which it is to be impressed on a transmitting antenna or other transmitting agency. This connection has a particular advantage in that the current flowing through the resistor 32 necessarily contains a direct current component which is representative of the average light intensity of the image impinging on the target surface. This current component may be used in the generation of a signal component useful to control the average brightness intensity of the picture being reproduced at the receiving station.

The target construction described in the foregoing possesses a marked advantage over previously used arrangements of which I am aware in that substantially the full photoemission of the photo-sensitive component of the target may be employed in signal production. This is a consequence of the fact that a relatively strong electrical field is maintained at all times in the vicinity of the photoelectric layer 33 due to the charges formed on the insulating particles which compose the layer 34. As a result, transverse dispersion of the released photoelectrons (that is, collection of photoelectrons released from one area by adjacent areas) is substantially avoided. An improvement in this respect of at least several hundred percent may be realized over systems in which the photosensitive surface is scanned directly.

In addition to the advantage just mentioned, the invention also avoids objectionable redistribution of secondary electrons produced by the scanning beam in that it prevents the collection of such electrons by areas adjacent to the region being scanned. This is due to the fact that the photoelectrons deposited on the various elemental areas of the insulating layer 34 cause them to assume a relatively negative potential which is unfavorable to the collection of electrons released from nearby sources.

Several procedures may be employed in the preparation of a target of the character specified. One satisfactory procedure involves evaporating rhodium on the interior surface of the window part 24 and covering the rhodium layer with a semi-transparent evaporated layer of antimony before the parts of the tube envelope are assembled. Still without assembling the tube, the antimony is then covered with a porous insulating deposit of magnesium oxide, aluminum oxide, or the like. In the case of magnesium oxide, the application may be made by burning magnesium in an oxidizing atmosphere and permitting the resultant colloidal dispersion of magnesium oxide to impinge on the surface desired to be coated. Alternatively, one may apply magnesium oxide, aluminum oxide or a similar substance by spreading or sifting the oxide in the form of a fine powder. (Adherence of the oxide particles to the rhodium layer may be expected to occur as a result of Van de Waal and other attractive forces.) Thereafter, the tube is assembled and heated to a degassing temperature (preferably not above 300° C.) while connected to a vacuum pump.

After the preliminary evacuating steps, caesium is introduced by distillation while the tube is maintained at a temperature of from 150 to 250° C. With this procedure, the caesium penetrates the porous insulating layer, becoming alloyed with the antimony and forming therewith a combination of highly photosensitive character. As a final step, the tube is sealed off the vacuum pump.

According to an alternative procedure, the tube is assembled immediately after the rhodium layer is deposited. In this case, the antimony is introduced and deposited on the rhodium after the tube is baked out. Next, caesium is distilled into the tube by a known method, and the insulating layer is finally deposited on the antimony-caesium layer. This may be done either by sifting an insulating powder on the surface of the layer from a side tubulation adapted to be subsequently removed or by evaporating it from an auxiliary filament in the presence of an inert gas to assure a porous coating.

A still further method of preparing the photosensitive target involves sealing the parts of the tube together and evaporating silver in a thin semi-transparent layer on the interior surface of the tube window. The silver is then partially oxidized by establishing within the tube a glow discharge in oxygen, the silver layer being used as the cathode for such a discharge. After evacuation of the tube, the silver oxide is photosensitized by distilling a small quantity of caesium into the tube and then baking the tube at from 225 to 275° C. The sensitivity of the surface thus produced can be further enhanced, if desired, by evaporating a slight additional amount of silver on the same, following the evaporating procedure by a bakeout at from 150 to 200° C. Finally, a porous insulating layer may be deposited on the photosensitive surface by a sifting technique or one of the other techniques mentioned above.

A signal-generating electrode of the type described in the foregoing is well adapted for use in a system which incorporates means for amplifying or intensifying the light image before the image is caused to affect the signal-generating member. This may be done in one way by the arrangement shown in Fig. 3. In this figure, there is illustrated a discharge envelope 40 enclosing a cathode 41, a control electrode 42, and a further electrode 43, an appropriate potential relationship being maintained between these electrodes by means of voltage sources 44 and 45. Magnetic coils 47 and 48 are provided for the purpose of deflecting the electron beam generated by the electrode system in order to produce a scanning motion of the beam.

The end of the envelope 40 which is remote from the cathode 41 is provided internally with a photosensitive electrode 50 which may consist, for example, of antimony-caesium or of silver oxide which has been sensitized by caesium. The electrode 50 is in spaced parallel relation to another electrode or target comprising the combination of a very thin metal foil 52, consisting, for example, of aluminum of a thickness of a few hundred to one or two thousand angstrom units and a porous insulating layer indicated at 53 (see Fig. 3a). The layer 53, which is exposed to the scanning action of the electron beam provided by the electron gun structure, may be constituted of magnesium oxide or aluminum oxide deposited in the form of finely subdivided particles. A battery 55 serves to maintain the photosensitive element 50 at a relatively negative potential with respect to the grounded foil 52 so that electrons released from the photosensitive surface by the impingement of a light image thereon are projected toward the surface of the foil. The potential difference between the elements 50 and 52 may readily be made sufficiently great so that a substantial acceleration of the electron stream generated from the surface of the element 50 is produced.

As they impinge upon the surface of the foil element 52, the photoelectrons proceeding from the element 50 will release secondary electrons. If the foil 52 is very thin, as previously specified, these electrons may penetrate the foil and escape therefrom at the surface which is adjacent to the insulating layer 53. For the reasons given in connection with the device of Fig. 1, this latter layer is normally maintained at the potential of the electrode 43 by the action of the scanning beam so that a strong local field exists at the surface of the foil 52. This field causes electrons released from the various areas of the foil to be collected upon the correspondingly located areas of the layer 53. The electronic charges thus produced are cyclically neutralized by the action of the scanning beam, such neutralization being accompanied by the appearance of a signal voltage across a resistor 57 provided for that purpose in the grounding connection of the foil 52.

The arrangement just described has the advantage that with proper correlation of potentials the number of electrons released from the foil 52 by the impingement of photoelectrons thereon may be considerably greater than the number of photoelectrons themselves. Accordingly, there is obtained an effective amplification of the light image prior to the occurrence of any charging of the insulating layer 53. The fact that both the elements 50 and 52 are conductive and are of planar character facilitates the maintenance between them of a uniform electric field and assures that the cross section of the electron stream projected from the element 50 shall maintain a pattern corresponding to the light image by which it is produced. If desired, magnetic focusing means (not shown) may be used to enhance this effect.

A still further means for obtaining image amplification is illustrated in Fig. 4. In this arrangement as in those previously described, there is provided an evacuated discharge envelope 60 having therein a cathode 61 and a pair of appropriately biased cooperating electrodes 62 and 63. Deflecting coils 64, 65 are also provided.

As in the arrangement of Fig. 3, the end of the discharge envelope has on its inner wall surface a photosensitive layer 67. This is in spaced parallel relation to a signal-generating electrode or target which includes (see Fig. 4a) a thin non-translucent metallic layer 69, a layer of electron-responsive luminescent material 70 sufficiently thin to be of semi-transparent character, a transparent supporting plate 71 of glass or mica, a thin conductive layer 76, a very thin, preferably semi-transparent photosentitive layer 72, and a porous insulating layer 73. With this disposition of parts, photoelectrons released from the element 67 are projected toward the metallic surface 69 with sufficient velocity to penetrate the metallic layer and to excite the fluorescent layer 70 in such fashion as to produce thereon a replica of the light image by which the element 67 is excited. The opaque character of the metallic layer 69 prevents the occurrence of light radiation from the fluorescent layer in the direction of the photosensitive element 67 and thus avoids objectionable secondary excitation of this element. All the light developed by the fluorescent material is, however, enabled to affect the photosensitive layer 72 and to release photoelectrons from this layer. In accordance with the principles previously described herein, the released photoelectrons are collected on the positively charged surface of the insulating layer 73, being subsequently discharged by the action of the scanning beam with the consequent generation of a signal voltage. (The signal voltage is caused to appear across a resistor 74 connected between the layer 76 and ground, just as described in connection with Figs. 1 and 2.)

It is assumed that in the operation of a system such as that of Fig. 4 a sufficient potential is maintained between the elements 67 and 69 (as by a battery 75) to assure that the light image produced by the fluorescent layer 70 shall be of greater intensity than the primary image to which the excitation of the element 67 is due. (From another standpoint this means that the electrons released from the photosensitive element 72 exceed in number those released from the element 67.) The amplification thus produced manifests itself usefully in the production of a relatively greater charge on the various areas of the insulating layer 73 than might be realized, for example, with the more elementary arrangement of Fig. 1.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In a signal-generating apparatus, an element adapted to release electrons therefrom in a pattern determined by image-bearing radiations impinging on the element, a porous insulating layer in direct contact with the surface of said element and providing a large number of discrete exposed areas for receiving and retaining electrons released from corresponding areas of the element, means for scanning the said exposed areas of the insulating layer with a beam of electrons in order to release secondary electrons from the various areas in accordance with the charges received thereon from the said element, and means for collecting the said secondary electrons.

2. In a signal-generating apparatus, the combination which includes an electrode element adapted to release electrons therefrom in a pattern determined by image-bearing radiations impinging on the element and having one side thereof exposed to the impingement of such radiations, the said element being sufficiently thin so that electrons released as a result of radiations impinging on the said one side thereof may escape from the element at the opposite side thereof, a porous insulating layer contiguous with the last-mentioned side of said electrode element and providing a large number of discrete exposed areas for receiving and retaining electrons escaping from corresponding areas of the element, means for scanning the said exposed areas of the insulating layer with a beam of electrons to generate secondary electrons from the various areas in accordance with the charges received thereon, and means for collecting the said secondary electrons.

3. In a cathode ray tube apparatus, a sheet-like photo-sensitive element adapted to release electrons in a pattern determined by a light image impinging on the element, a porous layer of finely divided insulating material in direct contact with one surface of the element and providing a large number of discrete exposed areas for receiving electrons released from corresponding areas of the element, means for scanning said exposed areas with a beam of electrons to generate secondary electrons from the various areas in accordance with the charges received thereon, and means for collecting the said secondary electrons.

4. In a signal-generating apparatus, the structural combination which includes a partially transparent conductive metal layer, a photosensitive layer superimposed on said conductive layer and adapted to release electrons in a pattern determined by a light image projected through the conductive layer, a porous layer of finely divided insulating material on said photosensitive layer and providing a large number of discrete exposed elemental areas for receiving electrons released from corresponding areas of the photosensitive layer, means for scanning said insulating layer with a beam of electrons to generate secondary electrons from the various exposed areas of the layer in accordance with the charges received thereon from the photosensitive layer, and means for collecting the said secondary electrons.

5. In a signal-generating apparatus, the combination which includes a transparent supporting member a semi-transparent conductive layer of rhodium on said supporting member, a photosensitive layer superimposed on said rhodium layer and adapted to release electrons in a pattern determined by a light image projected through the rhodium layer, a porous layer of finely divided insulating material on said photosensitive layer and providing a large number of discrete exposed elemental areas for receiving electrons released from corresponding areas of the photosensitive layer, means for scanning said insulating layer with a beam of electrons to generate secondary electrons from the various exposed areas of the layer in accordance with the charges received thereon from the photosensitive layer, and means for collecting the said secondary electrons.

6. In a cathode ray tube apparatus, means providing a conductive surface adapted to release electrons in a pattern determined by image-bearing radiations impinging on the surface, a porous insulating layer on said surface and providing a large number of discrete exposed elemental areas for receiving electrons released from corresponding areas of the surface, means for scanning said insulating layer with a beam of electrons in order to generate secondary electrons from the various exposed elemental areas of the layer in accordance with the charges received thereon from the said surface, and an electrode positioned in spaced relation with respect to said insulating layer for receiving secondary electrons from the layer, said electrode being adapted to be maintained at a positive potential with relation to said conductive surface.

7. In a signal-generating apparatus, an enclosing envelope, a photosensitive member at one end of the envelope adapted to release electrons in a pattern determined by a light image impinging thereon and having one side thereof exposed to the impingement of such radiations, the member being sufficiently thin so that electrons released as a result of radiations impinging on the said one side thereof may escape from the element at the opposite side thereof, a porous insulating layer superimposed on the said opposite side of the photosensitive member and providing a large number of discrete exposed elemental areas for receiving electrons escaping from corresponding areas of the photosensitive member, means including an electron beam source at the end of said envelope remote from said photosensitive member for scanning the said insulating layer in order to generate secondary electrons from various exposed areas of the layer in accordance with the charges received thereon from the photosensitive member, and an electrode positioned cooperatively with respect to said insulating layer for receiving secondary electrons from the layer, said electrode being adapted to be maintained at a positive potential with relation to said photosensitive member.

8. In combination, means for producing a stream of electrons having a cross-sectional pattern which is representative of a light image, a conductive target having one side thereof exposed to the impingement of said stream of electrons, said target being of such composition and thinness and being maintained at such potential that electrons impinging on the said one side are effective to release electrons from the other side thereof in a ratio greater than unity, a porous layer of finely divided insulating material applied to the last-named side of the target and providing a large number of discrete exposed areas for receiving electrons released from corresponding areas of the target, means for scanning the insulating layer with a beam of electrons in order to generate secondary electrons from the various exposed areas of the layer in accordance with the electronic charges received thereon from the said target, and means for collecting the said secondary electrons.

9. In combination, means for producing an electron stream having a cross-sectional pattern which is representative of a light image, an electron permeable metallic foil exposed to the impingement of said stream, a porous layer of finely divided insulating material on said foil and providing a large number of discrete elemental areas for receiving secondary electrons released from corresponding areas of the foil by the impingement of the said electron stream thereon, circuit means for maintaining the foil at such a potential that the number of secondary electrons emitted therefrom exceeds the number of electrons in the said stream, means for scanning the said insulating layer with an electron beam in order to generate secondary electrons from the various elemental areas thereof in accordance with the secondary electronic charges received by such areas from the foil, and means for collecting the said secondary electrons generated from said insulating layer.

10. In combination, means for producing an electron stream having a cross-sectional pattern which is representative of a light image, means providing a layer of electron-sensitive luminescent material exposed to the impingement of said stream, a layer of photosensitive material in light-receiving relation with respect to said luminescent layer, a layer of porous insulating material superimposed directly on said photosensitive material and providing a large number of discrete exposed elemental areas for receiving and retaining electrons released from corresponding areas of the photosensitive material by light projected thereon, means for scanning the said insulating layer with an electron beam in order to generate secondary electrons from the various elemental areas thereof in accordance with the electronic charges received by such areas from the photosensitive layer, and means for collecting the said secondary electrons.

11. In a signal-generating apparatus, an element adapted to release electrons therefrom in a pattern determined by image-bearing radiations impinging on the element, a porous insulating layer in direct contact with the surface of said element and providing a large number of discrete uniformly distributed and exposed areas for receiving and retaining electrons released from corresponding areas of the element, a collector electrode in spaced relation with said layer, and means for scanning the exposed areas of the insulating layer with a beam of electrons thereby charging said areas positively and for releasing secondary electrons from the various areas in accordance with the charges produced thereon by said element whereby signal indications may be derived from either said collector electrode by variations in the secondary electron emission current due to variations in the potential difference between said layer and said collector or from said element by virtue of the electrostatic coupling between said areas and said element.

12. In a cathode ray tube apparatus, a sheet-like photo-sensitive element adapted to release electrons therefrom in a pattern determined by a light image impinging on the element, a homogeneously distributed porous layer of finely divided insulating material in direct contact with one surface of the element and providing a large number of discrete uniformly distributed and exposed areas for receiving electrons released from corresponding areas of the element, collector means in spaced relation from said layer, and means for scanning the exposed areas with a beam of electrons to generate secondary electrons from the various areas thereby maintaining said areas at substantially collector means potential at low levels of light intensity impinging on said element and for producing variations in the secondary-electron emission current transmitted between the areas of said layer and said collector means upon variations of the potential of the areas occasioned by the photo-electron current between said element and said areas.

13. In a cathode ray type tube apparatus for producing variations in an electrical quantity responsive to a light image and which comprises a photo-emissive element and an energy storage porous layer in contact therewith, the method of operation which comprises scanning said porous layer with an electron beam and maintaining the potential of said layer at collector electrode potential by virtue of the secondary-electron emission between said layer and said beam, causing variations in the potential of discrete areas of said layer by virtue of photo-emissive electron current flow between said element and said layer and utilizing the current flow in said collector electrode for furnishing an indication of the pattern of light intensity.

14. In a signal-generating apparatus, the combination including a partially transparent conductive metallic layer, a photo-sensitive layer superimposed on said conductive layer and adapted to release electrons in a pattern determined by a light image projected through the conductive layer, a homogeneously distributed porous layer of finely divided insulating material on said photo-sensitive layer and providing a large number of discrete elemental areas for receiving electrons released from opposite areas of the photo-sensitive layer, collector electrode means, means for scanning said porous layer with a beam of electrons for maintaining said porous layer at substantially collector electrode potential for small light-levels or zero light intensity by virtue of the secondary-electron emission current flow from the various exposed areas, the signal being obtained by virtue of the difference in current flow between the various exposed areas incident to the change in area potentials occasioned by the photo-electron current between said porous layer and said photo-sensitive layer.

15. In a signal-generating apparatus, an element adapted to release electrons therefrom in a pattern determined by image-bearing radiations impinging on the element, a uniformly distributed porous insulating layer in direct contact with the surface of said element and providing a large number of discrete and exposed areas for receiving and retaining the electrons released from corresponding areas of the element, a collector electrode in spaced relation with said layer, and means for scanning the exposed areas of the insulating layer with a beam of electrons thereby charging said areas positively due to the secondary-electron current flow from said areas to said collector electrode, the magnitude of the current flow incident to the impingement of the electron beam thereon being a function of the charge thereof due to the photo-electron current transmitted from said element to the areas, and said discrete areas serving to prevent interchange of charge thereamong due to cross fields between such areas of the insulating layer thereby maintaining sufficient negative differential charges between said areas to produce distinct signal variations when collected during the scanning operation of said beam.

HENRY M. SMITH.